US012393063B2

(12) United States Patent
Spyra et al.

(10) Patent No.: US 12,393,063 B2
(45) Date of Patent: Aug. 19, 2025

(54) OPTICAL MODULATOR WITH SINK WAVEGUIDE

(71) Applicant: X Development LLC, Mountain View, CA (US)

(72) Inventors: Aleksandra Spyra, Mountain View, CA (US); Ian Alexander Durant Williamson, Palo Alto, CA (US); Alfred Ka Chun Cheung, Belmont, CA (US)

(73) Assignee: X Development LLC, Mountain View, CA (US)

( * ) Notice: Subject to any disclaimer, the term of this patent is extended or adjusted under 35 U.S.C. 154(b) by 272 days.

(21) Appl. No.: 17/884,970

(22) Filed: Aug. 10, 2022

(65) Prior Publication Data

US 2024/0053625 A1 Feb. 15, 2024

(51) Int. Cl.
*G02F 1/025* (2006.01)
(52) U.S. Cl.
CPC .................. *G02F 1/025* (2013.01)
(58) Field of Classification Search
CPC ... G02F 1/00; G02F 1/01; G02F 1/025; G02F 1/122; G02B 6/122; G02B 6/1225; H04B 10/50575; H04B 10/50572
See application file for complete search history.

(56) References Cited

U.S. PATENT DOCUMENTS 6,618,535 B1 * 9/2003 Reynolds ............. G02B 6/1225
385/129
7,555,226 B2 * 6/2009 Tipper ............. H04B 10/50575
398/198

(Continued)

FOREIGN PATENT DOCUMENTS

WO 2011142819 A2 11/2011
WO 2011-157509 A1 12/2011

OTHER PUBLICATIONS

International Search Report and Written Opinion, mailed Nov. 21, 2023, in corresponding International Patent Application No. PCT/US2023/029725, 10 pages.
Lalau-Keraly, et al., "Adjoint Shape Optimization Applied to Electromagnetic Design", Optical Society of America, 2013, 9 pages.
Reed et al., "Silicon Optical Modulators", Materials Today, Jan. 2005, 11 pages.

(Continued)

*Primary Examiner* — Thomas A Hollweg
*Assistant Examiner* — Kirsten D. Endresen
(74) *Attorney, Agent, or Firm* — Christensen O'Connor Johnson Kindness PLLC (57) ABSTRACT

An optical modulator includes a modulation region, input, output, and sink ports, and a modulation actuator. The modulation region includes an inhomogeneous arrangement of two or more different materials having different refractive indexes. The input port is optically coupled to the modulation region to inject an optical carrier wave into the modulation region. The output port is optically coupled to the modulation region to receive and emit a modulated signal having a high state and a low state. The sink port is optically coupled to the modulation region. The modulation actuator is disposed proximate to the modulation region and adapted to apply a modulation bias to the modulation region that influences the different refractive indexes of the inhomogeneous arrangement to selectively steer a portion of optical power of the optical carrier wave to the sink port when the modulated signal is modulated into the low state.

11 Claims, 8 Drawing Sheets

(56) References Cited

U.S. PATENT DOCUMENTS

| | | | |
|---|---|---|---|
| 7,706,692 B2 | 4/2010 | Tatum et al. | |
| 9,069,224 B2 | 6/2015 | Nishimoto et al. | |
| 10,069,562 B2 | 9/2018 | Wang | |
| 10,386,300 B2 | 8/2019 | Wu et al. | |
| 11,187,854 B2 | 11/2021 | Schubert et al. | |
| 2003/0185532 A1* | 10/2003 | Hosomi | G02B 6/1225 385/125 |
| 2005/0008285 A1* | 1/2005 | Kim | G02B 6/3514 385/18 |
| 2011/0206384 A1 | 8/2011 | Zhou et al. | |
| 2016/0356708 A1* | 12/2016 | Bennett | G02F 1/0147 |
| 2018/0045953 A1 | 2/2018 | Fan et al. | |
| 2020/0387577 A1 | 12/2020 | Adolf et al. | |
| 2023/0152517 A1* | 5/2023 | Rodrigues | G02F 1/313 385/16 |

OTHER PUBLICATIONS

Tu et al., "Fabrication of low loss and high speed silicon optical modulator using doping compensation method", Optics Express, vol. 19, No. 19, Sep. 12, 2011, 7 pages.

Wahab et al., "Electromagnetic time reversal algorithms and source localization in lossy dielectric media", arXiv:1403.6463v2 [math-ph] Sep. 16, 2014, 20 pages.

* cited by examiner $$Loss(x) = \sum_\lambda TLoss(x, \lambda) + RLoss(x, \lambda) + SLoss(x, \lambda) \quad \text{—205}$$

$$TLoss(x, \lambda) = T_{OFF}^2(x, \lambda) + (1 - T_{ON}(x, \lambda))^2 + (T_{ON}(x, \lambda) - T_{OFF}(x, \lambda))^2 \quad \text{—210}$$

$$RLoss(x, \lambda) = R_{ON}^2(x, \lambda) + R_{OFF}^2(x, \lambda) \quad \text{—215}$$

$$SLoss(x, \lambda) = S_{ON}^2(x, \lambda) + (1 - S_{OFF}(x, \lambda))^2 \quad \text{—220}$$

FIG. 2A

$$SLoss(x, \lambda) = \cancel{S_{ON}^2(x, \lambda)} + (1 - S_{OFF}(x, \lambda))^2 \quad \text{—225}$$

OPTICAL MODULATOR WITH SINK WAVEGUIDE

TECHNICAL FIELD

This disclosure relates generally to photonic devices, and in particular, relates to optical modulators.

BACKGROUND INFORMATION

An optical modulator is an active component which allows a user to modulate the power level of an optical signal via an applied bias. This bias is typically achieved by changing voltage which electro-optically, thermo-optically, or mechano-optically tunes the refractive index of a material in some region of an integrated device. When the bias is modulated at high speed (GHz rates), information and data can be encoded and transmitted to a distant receiver via the optical carrier wave.

Typical modulators are designed by humans using well understood components (e.g. combinations of waveguide-based phase shifters and directional couplers or modulated ring resonators). However, these conventional components have limits: they are large in footprint and have a limited number of "knobs" by which their performance can be improved and tweaked.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for an inverse designed optical modulator with a waveguide sink capable of providing power recycling are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

During operation of conventional optical modulators, a significant portion of the optical carrier wave is wasted. For example, a conventional ON-OFF keying modulation scheme may result in the optical power of the optical carrier wave being rejected or wasted during the OFF-logic state. This wasted energy not only reduces the efficiency of these conventional optical modulators, but also creates heat buildup within the optical modulator that needs to be dissipated. As such, conventional optical modulators may be designed with larger bulk substrates that are thermally coupled to a heat sink to adequately reject and manage the wasted power.

Embodiments described herein use inverse design techniques to design a modulation region of an optical modulator to reject or recycle wasted optical power by diverting it to sink port or sink waveguide, which can then carry the optical power away from the modulator to prevent deleterious heat buildup. This technique keeps the power in the optical realm, enabling the power to be guided away from the optical modulator as opposed to dissipated as thermal energy within the optical modulator. Keeping the rejected power in the optical realm not only enables the creation of smaller, more compact optical modulators but also provides opportunities to create more efficient optical modulators. In particular, the optical power of the carrier wave that is rejected during the logic LOW or logic OFF encoding state of the optical modulator is efficiently guided out of the modulation region via a sink port and sink waveguide. In various embodiments, this optical power is then harvested using an integrated photoreceiver (e.g., photovoltaic or photoelectric device, etc.). For example, a photodiode or photovoltaic cell may convert this rejected optical power to power other circuitry or even power a modulation controller (e.g., modulation driver) of the optical modulator itself. Embodiments describes herein not only facilitate more compact optical modulators that are less reliant upon heat sinks, but also more energy efficient optical modulators.

Figure 1:
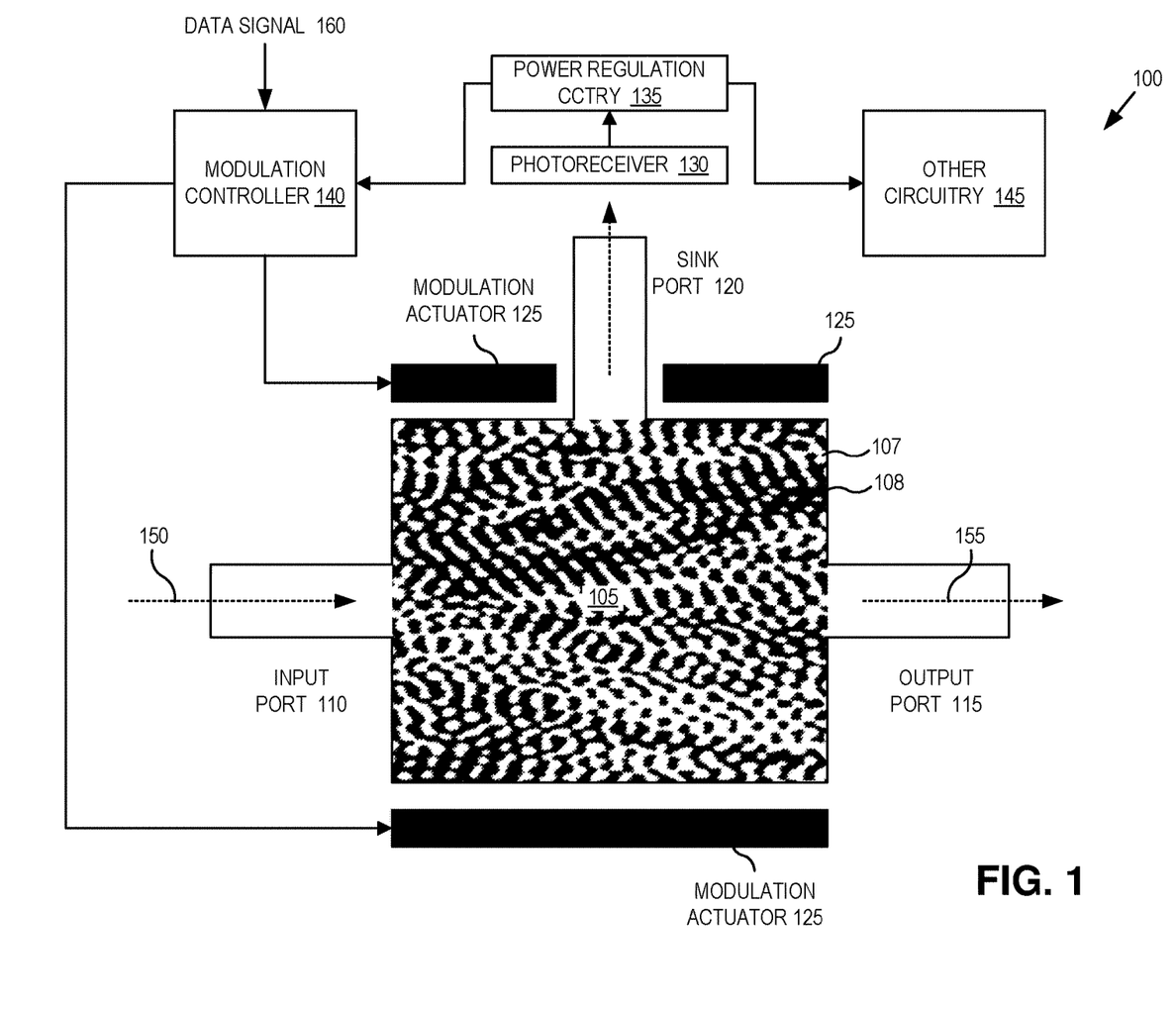
FIG. 1 illustrates an optical modulator with a sink waveguide for power recycling, in accordance with an embodiment of the disclosure.

FIG. 1 illustrates an optical modulator 100 with a sink port/waveguide for power recycling, in accordance with an embodiment of the disclosure. The illustrated embodiment of optical modulator 100 includes a modulation region 105, an input port 110, an output port 115, a sink port 120, a modulation actuator 125, a photoreceiver 130, power regulation circuitry 135, a modulation controller 140, and other circuitry 145. The illustrated embodiment of the modulation region includes an inhomogeneous arrangement of two different materials 107 and 108 having different refractive indexes.

Modulation region 105 may also be referred to as the "design region" or "active region" where a pattern of discrete regions of the materials 107 and 108 operate to selectively steer, via refraction/scattering, the inbound optical carrier wave 150 received via input port 110 to either output port 115 or sink port 120 under the influence of modulation actuator 125. This selective steering implements an ON-OFF keying modulation scheme where optical power is either primarily directed to output port 115 during an ON or HIGH logic state, or primary directed to sink port 120 during an OFF or LOW logic state of the modulated wave 155. In this manner, data signal 160 is modulated onto optical carrier wave 150 to generate modulated wave 155.

Materials 107 and 108 are discrete regions of material with differing refractive indexes, which refractive indexes change in response to a bias (e.g., applied voltage, current, temperature, pressure). In one embodiment, materials 107 and 108 may be a waveguiding core material and a waveguiding cladding material, respectively. This core and cladding material may be the same core and cladding material used to form the waveguide sections of input port 110, output port 115, and sink port 120. For example, material 107 may be silicon while material 108 may be silicon dioxide. In yet other embodiments, materials 107 and 108 may be implemented as discrete regions of intrinsic silicon and doped silicon, discrete regions of differently doped silicon, or may be combinations of other types of semiconductor material (e.g., III-V semiconductor material, etc.). In one embodiment, modulation region 105 is approximately 1.5 um by 1.2 um while ports 110, 115, and 120 are waveguide sections having a 200 nm width and a 600 nm length. The discrete regions of materials 107 and 108 may be implemented as conglomerations of each material type 107 or 108 in incremental pixel/voxel sizes of 5 nm×5 nm. Of course, other pixel/voxel resolutions may be implemented.

Modulation is achieved via a modulation bias that is applied to modulation region 105 via modulation actuator 125, which in turn is driven by modulation controller 140 in response to data signal 160. Accordingly, modulation controller 140 may include a modulation/demodulation circuitry along with driver circuitry to drive modulation actuator 125. The modulation actuator 125 may be implemented using a number of techniques. In one embodiment, modulation actuator 125 includes electrodes surrounding sides of modulation region 105 and the modulation bias is an applied voltage and/or injected current. In another embodiment, modulation actuator 125 includes one or more heating elements surrounding modulation region 105 and the modulation bias is an adjustable temperature. In yet another embodiment, modulation actuator 125 includes an electromechanical actuator (e.g., piezoelectric crystal, microelectromechanical systems, etc.) surrounding modulation region 105 and the modulation bias is an adjustable pressure. Each of these modulation biases serve to change the refractive index of the materials 107 and 108, which in turn affect the scattering/refraction of optical carrier wave 150 to selectively steer between output port 115 and sink port 120.

In the illustrated embodiment, input port 110, output ports 115, and sink port 120 are each adjacent to modulation region 105 and operate as optical inputs or outputs for propagating waves. Although input port 110, output port 115, and sink port 120 are referred to as "ports", these ports may include longitudinal length in the direction of light propagation. As such, input port 110, output port 115, and sink port 120 may be implemented as waveguide sections having a core and cladding with one end physically abutting, or otherwise optically coupled to, modulation region 105. In various embodiments, input port 110, output port 115, sink port 120, and modulation region 105 are all planar waveguide sections. These planar waveguide sections may be embedded within a semiconductor material such as a silicon-on-insulator (SOI) system, a photonic integrated circuit (PIC), or otherwise.

The inhomogeneous arrangement of material 107 and 108 form a pattern that is determined based upon an iterative minimization of a loss function 205 (see FIG. 2A) defined as a sum of a transmission loss function 210 at output port 115, a reflection loss function 215 at input port 110, and a sink loss function 220 at sink port 120. Inverse design techniques may consider the layout of an optical modulator, such as optical modulator 100, constructed with input port 110, modulation (design) region 105, output port 115, and sink port 120. Multiple bias points of the optical modulator are simulated in parallel by constructing device geometries or patterns of materials 107 and 108 using the same overall topology but with different perturbations to the refractive index, dn=[dn1, dn2, dn3, . . . ] in one of the materials 107 or 108. These parallel simulations thus calculate the optical transmission from input port 110 to output port 115 as a function of the refractive index perturbation T(dn).

An optimization objective of the inverse design methodology is constructed as a function of this transmission, L(T(dn)) and is designed to optimize for a desired T(dn). The objective is constructed in a way that the resulting structure/pattern is able to guide the light through sink port 120 in the case when transmission in the output port 115 is desired to be LOW or OFF. This enables control over the otherwise lost power. This power can be further recycled by other components (e.g., modulation controller 140 or other circuitry 145) accompanying optical modulator 100 without a detrimental effect on optical modulator 100.

Inverse design operates using a design simulator (aka design model) configured with an initial design or pattern for modulation region 105 to perform a forward operational simulation of the initial design (e.g., using Maxwell's equations for electromagnetics). The output of the forward operational simulation is a simulated field response at output port 115 and sink port 120. Specific performance parameters of this output field response may be selected as parameters of interest (e.g., power loss, wavelength, etc.) and are referred to as simulated performance parameters. The simulated performance parameters are used by loss function 205 to calculate a performance loss value, which may be a scalar value (e.g., mean square difference between simulated performance values and target performance values). The differentiable nature of the design model enables a backpropagation via an adjoint simulation of a performance loss error, which is the difference between the simulated output values and the desired/target performance values. The performance loss error (e.g., loss gradients) is backpropagated through the design model during the adjoint simulation to generate a structural design error at input port 110. Backpropagation of the performance loss error facilitates the computation of additional performance gradients, such as structural gradients that represent the sensitivity of the performance loss value to changes in the structural material properties (e.g., topology or pattern of materials 107 and 108) of modulation region 105. These gradients are output as a structural design error, which may then be used by a structural optimizer to perform an iterative gradient descent (e.g., stochastic gradient descent) that optimizes or refines the initial structural design to generate a revised structural design of modulation region 105. The forward and reverse simulations may then be iterated until the performance loss value falls within acceptable design criteria (referred to as saturation). The above description is merely an example inverse design technique that may be used to refine or optimize the features and topology of optical modulator 100. It is appreciated that other inverse design techniques alone, or in combination with other conventional design techniques, may also be implemented.

Figure 2A:
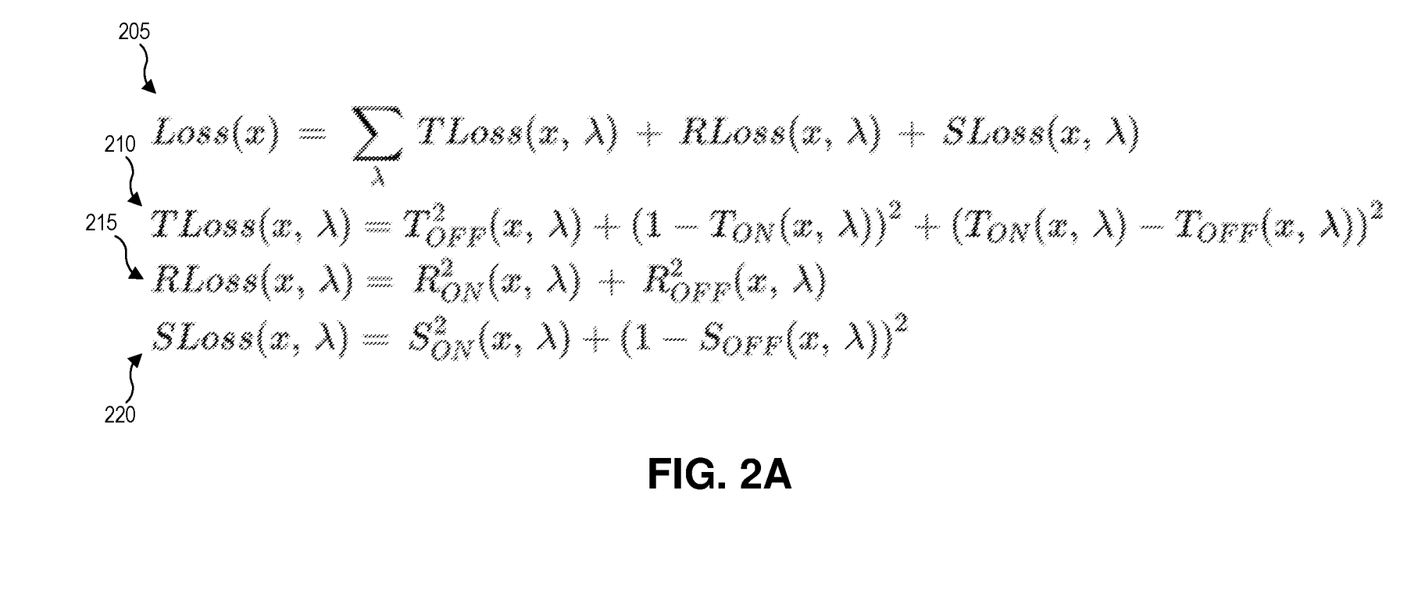
FIG. 2A illustrates a loss function for inverse design of the optical modulator, in accordance with an embodiment of the disclosure.
Figure 2B:
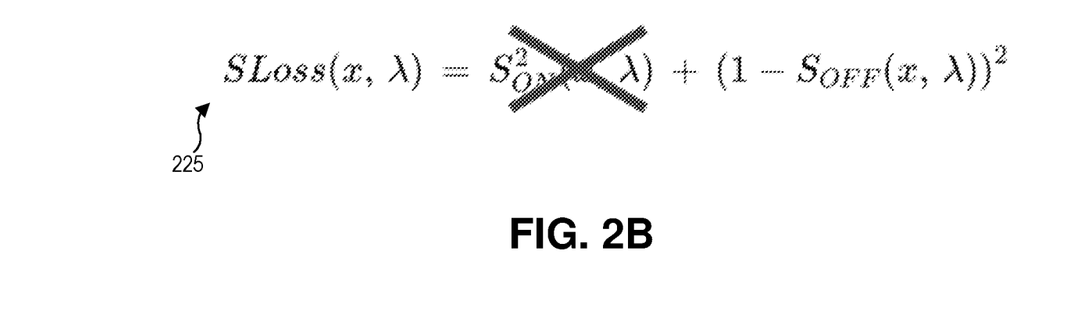
FIG. 2B illustrates how a sink loss function may be altered so as not to penalize transmission into the sink port during an ON state of the optical modulator while still obtaining acceptable operational efficiency of the optical modulator, in accordance with an embodiment of the disclosure.

The inverse design techniques described above may be applied to determine the specific material combinations, feature sizes, and feature arrangement (i.e., pattern) to achieve the desired power at each port for a given logic state of optical modulator 100 using loss function 205. Referring to FIG. 2A, loss function 205 is a function of x, where x is a vector representing the structural pattern of materials 107 and 108 having different refractive indexes. Transmission loss function 210 is defined by the transmission power T at output port 115 for ON and OFF logic states. Similarly, reflection loss function 215 is defined by the reflection power R at input port 110 for ON and OFF logic states while sink loss function 220 is defined by power S at sink port 120 for ON and OFF logic states. FIG. 2B illustrates an alternative sink loss function 225, which omits the term that penalizes power S at sink port 120 during the ON logic state of optical modulator 100.

Figure 3:
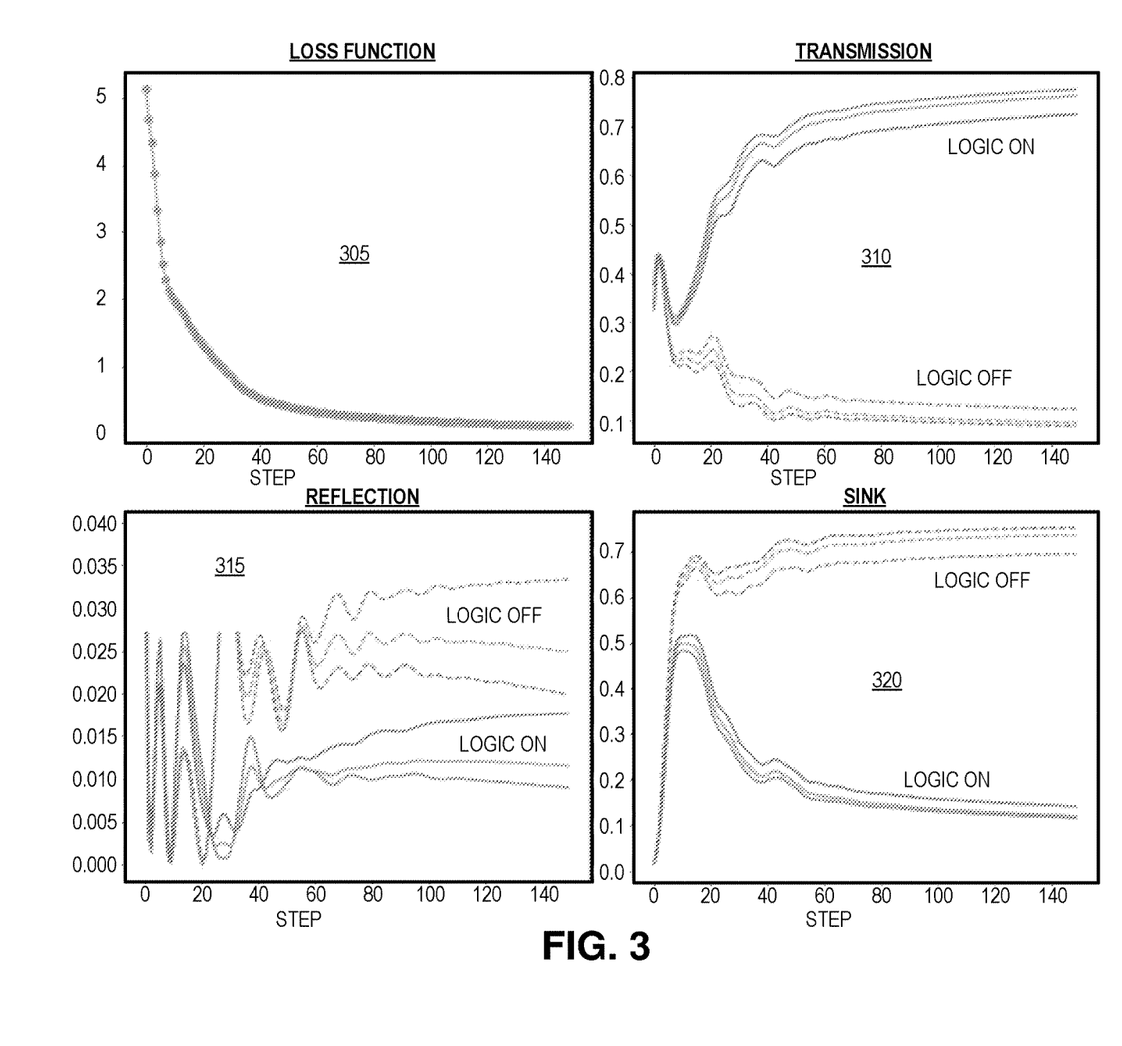
FIG. 3 includes charts illustrating the iterative inverse design of the modulation region using the loss function, in accordance with an embodiment of the disclosure.

FIG. 3 includes charts illustrating the iterative inverse design of modulation region 105 using loss function 205, in accordance with an embodiment of the disclosure. Chart 305 illustrates how loss function 205 saturates to a minimum value after approximately 140 forward and adjoint simulations. Chart 310 illustrates how the transmission power T at output port 115 saturates around 0.7 for a logic ON at three different wavelengths (e.g., 1545 nm, 1550 nm, and 1555 nm) and saturates around 0.1 for a logic OFF at those same wavelengths. Chart 315 illustrates how the reflection power R at input port 110 saturates below 0.035 for both logic ON and a logic OFF at the three wavelengths (e.g., 1545 nm, 1550 nm, and 1555 nm). Reflection power R at input port 110 is wasted power and therefore undesirable. Chart 320 illustrates how the sink power S at sink port 120 saturates around 0.7 for a logic OFF at three different wavelengths (e.g., 1545 nm, 1550 nm, and 1555 nm) and saturates close to 0.1 for a logic ON across those same wavelengths.

Returning to FIG. 1, sink port 120 is optically coupled with photoreceiver 130 to receive the optical power rejected during the logic OFF/LOW state of optical modulator 100. Instead of being wasted and converted into heat, this rejected optical power may be converted into electrical power via photoreceiver 130. Photoreciever 130 may be implemented with a photoelectric or photovoltaic device, such as a photodiode, photocell, or otherwise. The pulsing current is then rectified, or otherwise regulated with power regulation circuitry 135. Power regulation circuitry 135 may include a rectifier (e.g., diode), a storage capacitor, and/or other conventional regulation circuitry. The regulated power may then be coupled to power modulation controller 140 itself and/or other circuitry 145 which may also be embedded on-chip with optical modulator 100.

Figure 4:
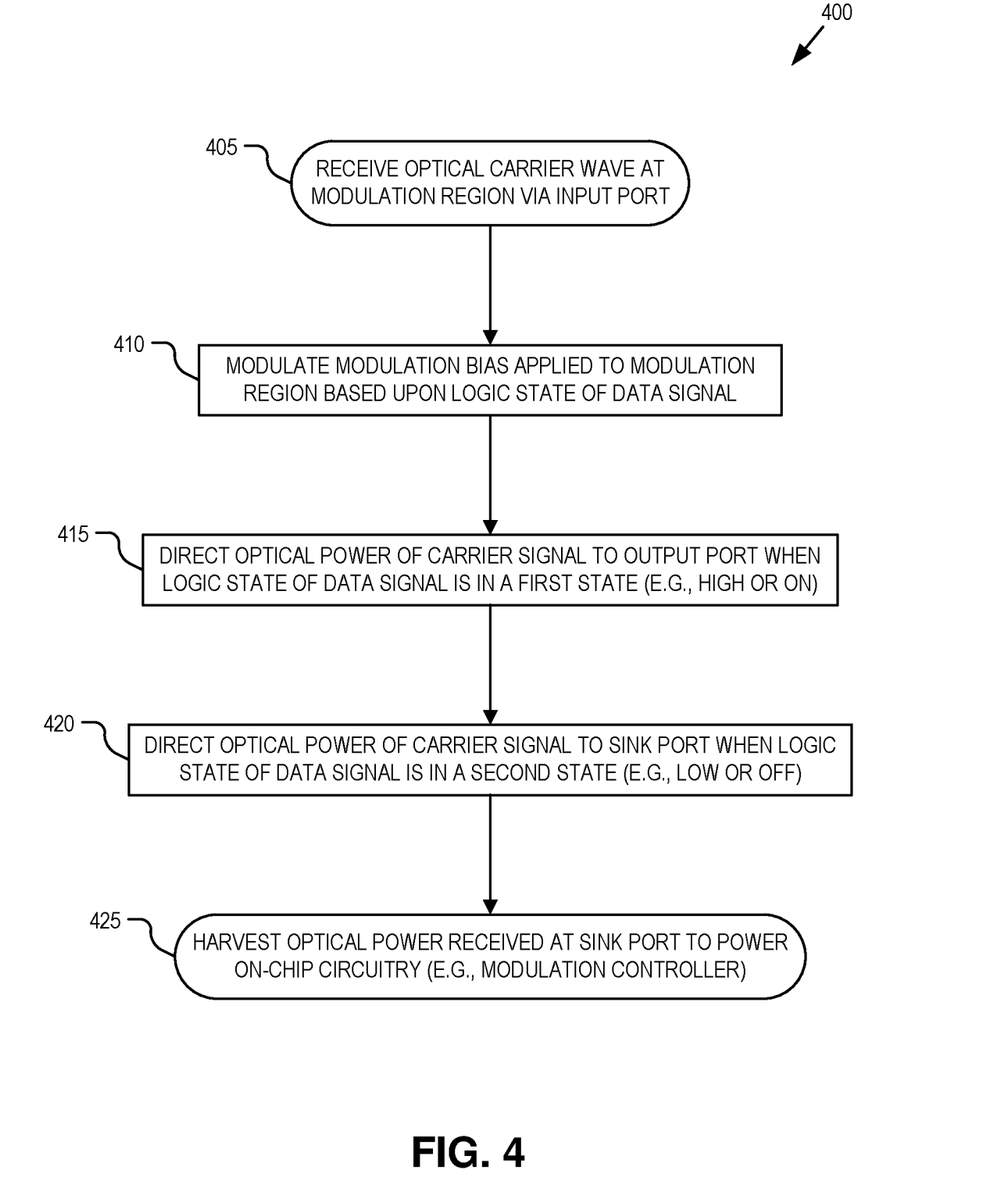
FIG. 4 is a flow chart illustrating operation of the optical modulator with a sink waveguide for power recycling, in accordance with an embodiment of the disclosure.

FIG. 4 is a flow chart illustrating a process 400 of operation of optical modulator 100, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, optical carrier wave 150 is a received a modulation region 105 via input port 110. Optical carrier wave 150 may be continuous wave generated by a laser source (e.g., laser diode, etc.) guided into input port 110 along a single mode waveguide (e.g., planar waveguide, fiber optic, etc.). The laser source may be an on-chip device integrated into a PIC with optical modulator 100, or a distinct off-chip device of which its output is guided to input port 110.

In a process block 410, optical carrier wave 150 is modulated within modulation region 105 in response to a modulation bias applied by modulation actuator 125. Modulation actuator 125 drives the modulation bias based upon data signal 160 received at modulation controller 140. In the illustrated embodiment, modulation region 105 includes an inhomogeneous arrangement of material 107 and 108 each having different refractive indexes that disperse (e.g., scatter, refract) optical carrier wave 150 in a controlled manner such that a majority of the optical power of optical carrier wave 150 is either directed/steered to output port 115 in an ON or HIGH logic state (process block 415) or the majority of the optical power is directed/steered to sink port 120 in a OFF or LOW logic state (process block 420). Of course, the logic state is determined by the modulation bias applied across modulation region 105 in response to data signal 160.

The modulation bias affects the power steering, and thus, logic state encoded on optical carrier wave 150 at output port 115 by inducing small changes in the refractive index of materials 107 and 108. Each discrete region of materials 107 or 108, which collectively form the pattern or inhomogeneous arrangement, represents a binary, contiguous block (homogeneous region) of either material 107 or 108 having a uniform refractive index. Application of the modulation bias across the overall inhomogeneous arrangement causes small changes in the refractive index of each contiguous block of material 107/108, which steers the optical power to output port 115 or sink port 120 depending upon the modulation bias. As previously mentioned, materials 107 and 108 may be implemented as discrete regions of two different materials, such as silicon and silicon oxide, though other material combinations may also be used. The overall pattern or inhomogeneous arrangement of materials 107 and 108 within modulation region 105 is determinable via inverse design using forward and adjoint simulations that seek to minimize loss function 205 presented above. Of course, other design techniques and loss functions may be implemented to arrive at a pattern or inhomogeneous arrangement of materials 107 and 108 according to the needs of a particular application of optical modulator 100.

Finally, in a process block 425, the optical power rejected or steered to sink port 120 during logic LOW or OFF states, is directed into photoreceiver 130 where the power is recycled or harvested for beneficial use (as opposed to discarded in the form of thermal heat and conducted away via a heat sink). Beneficial use may include powering modulation controller 140 itself, or other circuitry 145.

Figure 5A:
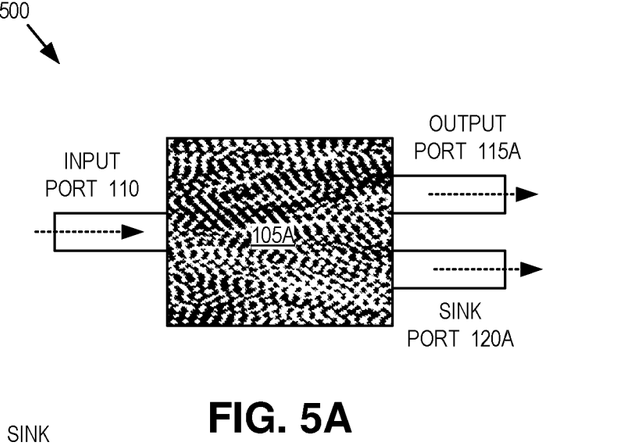
FIG. 5A illustrates an optical modulator with the input port, output port, and sink port oriented in parallel with each other, in accordance with an embodiment of the disclosure.
Figure 5B:
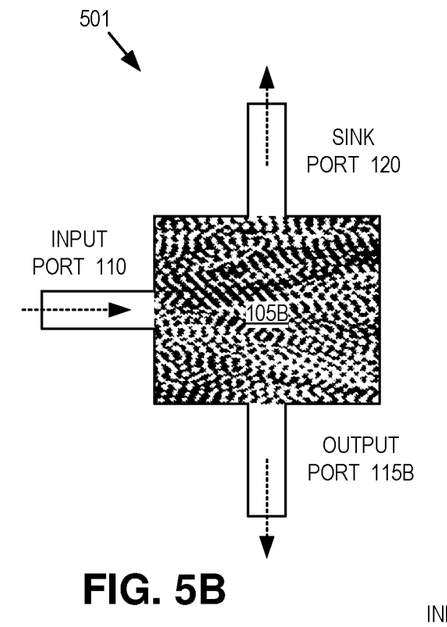
FIG. 5B illustrates an optical modulator with the input port oriented perpendicular to the sink port and the output port, in accordance with an embodiment of the disclosure.
Figure 5C:
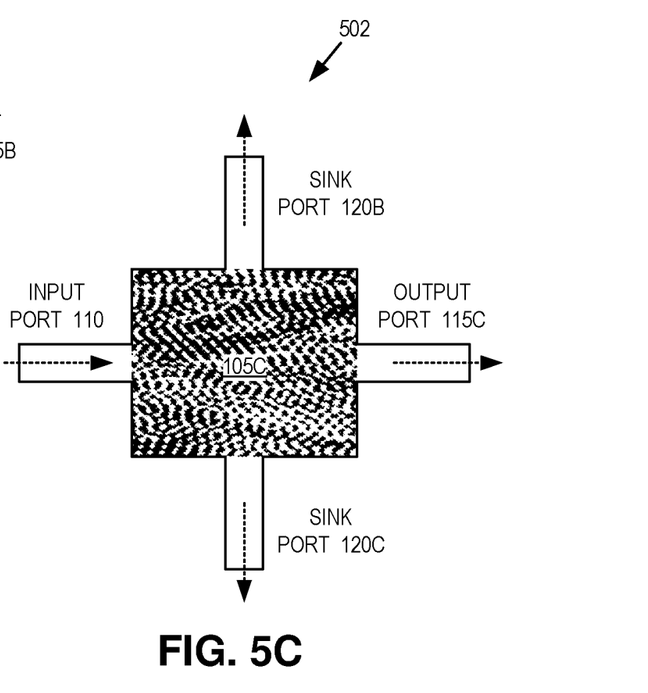
FIG. 5C illustrates an optical modulator with two sink ports, in accordance with an embodiment of the disclosure.

FIGS. 5A-C illustrate three example floor plan deviations from optical modulator 100, in accordance with embodiments of disclosure. FIG. 1 illustrates optical modulator 100 where the waveguide sections of input port 110 and output port 115 are parallel to each other and disposed on opposing sides of modulation region 105 from each other, but the waveguide section of sink port 120 is oriented perpendicular to that of input port 110 and output port 115. In contrast, FIG. 5A illustrates an optical modulator 500 with the waveguide sections of input port 110, output port 115A, and sink port 115A all aligned parallel to each other with output port 115A and sink port 120A disposed on a common side of modulation region 105A that is opposite to input port 110. FIG. 5B illustrates an optical modulator 501 with the waveguide sections of sink port 120 and output port 115B both perpendicular to the waveguide section of input port 110. Finally, FIG. 5C illustrates another example optical modulator 502 with two sink ports 120B and 120C, which are both perpendicular to input port 110 and output port 115C. It should be appreciated that the floorplan modifications illustrated in FIGS. 5A-C are not exhaustive. Other floorplan modifications may include obliquely oriented ports, ports of different cross-sectional sizes, etc. The modulation regions 105A, B, and C may all be designed using the same inverse design methodology described herein.

Figure 6A:
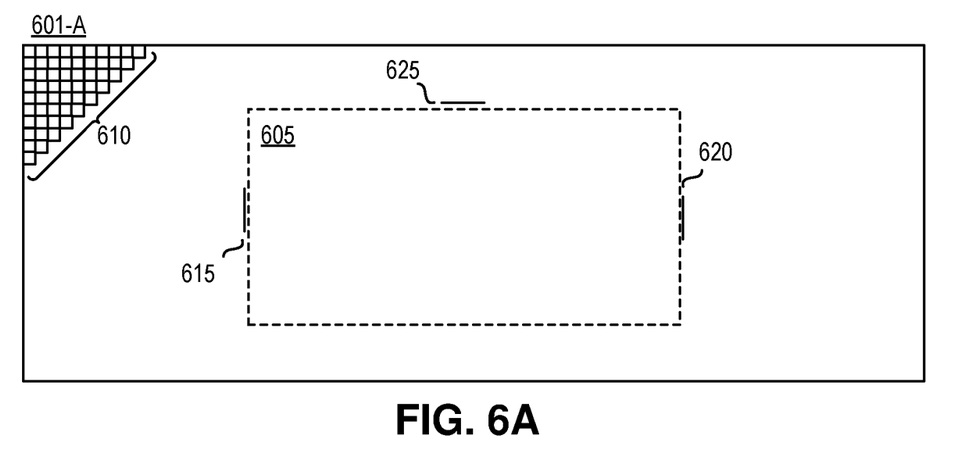
FIG. 6A illustrates a demonstrative simulated environment for simulating the operation of a physical device, in accordance with an embodiment of the disclosure.
Figure 6B:
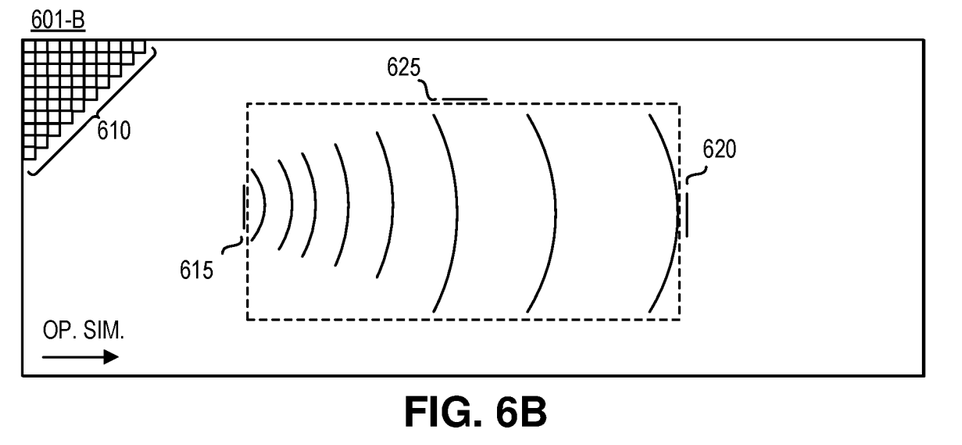
FIG. 6B illustrates an operational simulation of a physical device, in accordance with an embodiment of the disclosure.
Figure 6C:
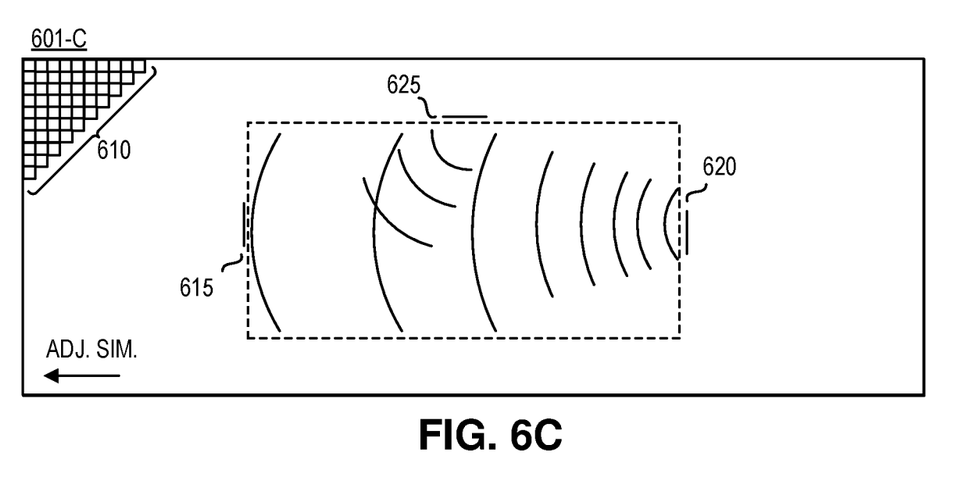
FIG. 6C illustrates an adjoint simulation (backpropagation) of a performance loss error through the simulated environment, in accordance with an embodiment of the disclosure.

FIGS. 6A-6C illustrate an initial setup, an operational simulation, and a adjoint simulation of a simulated environment 601, respectively, for optimizing structural parameters of a physical device (e.g., optical modulators 100, 500, 501, or 502) with a design model, in accordance with an inverse design embodiment. The simulated environment 601 and corresponding initial setup, operational simulation, adjoint simulation, and structural parameter optimization may be achieved via a physics simulator using Maxwell's equations. As illustrated in FIGS. 6A-6C, the simulated environment is represented in two-dimensions, however it is appreciated that higher dimensionality (e.g., 3-dimensional space) may also be used to describe the simulated environment 601 and the physical device. In some embodiments, the optimization of the structural parameters of the physical device illustrated in FIGS. 6A-6C may be achieved via, inter alia, simulations (e.g., time-forward and backpropagation) that utilize a finite-difference time-domain (FDTD) method to model the field responses (e.g., both electric and magnetic).

FIG. 6A illustrates an example rendering of a simulated environment 601-A describing an electromagnetic device. The simulated environment 601-A represents the simulated environment 601 at an initial time step (e.g., an initial set up) for optimizing structural parameters of the physical device. The physical device described by the simulated environment 601 may correspond to optical modulator 100 having a designable region 605 (e.g., modulation region 105) in which the structural parameters of the simulated environment may be designed, modified, or otherwise changed. The simulated environment 601 includes an excitation source 615 (e.g., a gaussian pulse, a wave, a waveguide mode response, and the like) at the location of input port 110. The electrical and magnetic fields (e.g., field response) within the simulated environment 601 (and the physical device) may change in response to the excitation source 615. The specific settings of the initial structural parameters, excitation source, performance parameters, and other metrics (i.e., initial description) for a first-principles simulation of a physical device are input before the operational simulation starts.

As illustrated, the simulated environment 601 (and subsequently the physical device) is described by a plurality of voxels 610, which represent individual elements of the two-dimensional (or three-dimensional) space of the simulated environment. Each of the voxels is illustrated as two-dimensional squares, however it is appreciated that the voxels may be represented as cubes or other shapes in three-dimensional space. It is appreciated that the specific shape and dimensionality of the plurality of voxels 610 may be adjusted dependent on the simulated environment 601. It is further noted that only a portion of the plurality of voxels 610 are illustrated to avoid obscuring other aspects of the simulated environment 601. Each of the plurality of voxels 610 is associated with one or more structural parameters, a field value to describe a field response, and a source value to describe the excitation source at a specific position within the simulated environment 601. The field response, for example, may correspond to a vector describing the electric and/or magnetic field at a particular time step for each of the plurality of voxels 610. More specifically, the vector may correspond to a Yee lattice that discretizes Maxwell's equations for determining the field response. In some embodiments, the field response is based, at least in part, on the structural parameters and the excitation source 615.

FIG. 6B illustrates an example operational simulation of the simulated environment 601-B at a particular time step in which the excitation source 615 is active (e.g., generating waves originating at the excitation source 615 that propagate through the simulated environment 601). As mentioned, the physical device is an optical modulator operating at the frequency of interest and having a particular waveguide mode (e.g., transverse electromagnetic mode, transverse electric mode, etc.) and the excitation source is at an input port 110. The operational simulation occurs over a plurality of time steps (see FIG. 3), including the illustrated time step. When performing the operational simulation, changes to the field response (e.g., the field value) for each of the plurality of voxels 610 are updated in response to the excitation source 615 and based, at least in part, on the structural parameters of the physical device at each of the plurality of time steps. Similarly, in some embodiments the source value is updated for each of the plurality of voxels (e.g., in response to the electromagnetic waves from the excitation source 615 propagating through the simulated environment). It is appreciated that the operational simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

When performing the operational simulation, performance loss functions (e.g., TLoss, RLoss, and SLoss) may be computed at each port 615, 620 and 625 based, at least in part, on a comparison (e.g., mean squared difference) between the field response and a desired field response at a designated time step (e.g. a final time step of the operational simulation). A performance loss value may be described in terms of a specific performance value (e.g., power). Structural parameters may be optimized for this specific performance value.

FIG. 5C illustrates an example backpropagation of performance loss error backwards within the simulated environment 601-C describing the physical device. In one embodiment, the adjoint performance simulation injects a performance loss error at output port 620 and sink port 625 as a sort of reverse excitation source for stimulating a reverse field response through voxels 610 of simulated environment 601-C. The adjoint performance simulation of the performance loss error determines an influence that changes in the structural parameters of voxels 610 have on the performance loss value (e.g., loss function 205).

Figure 7A:
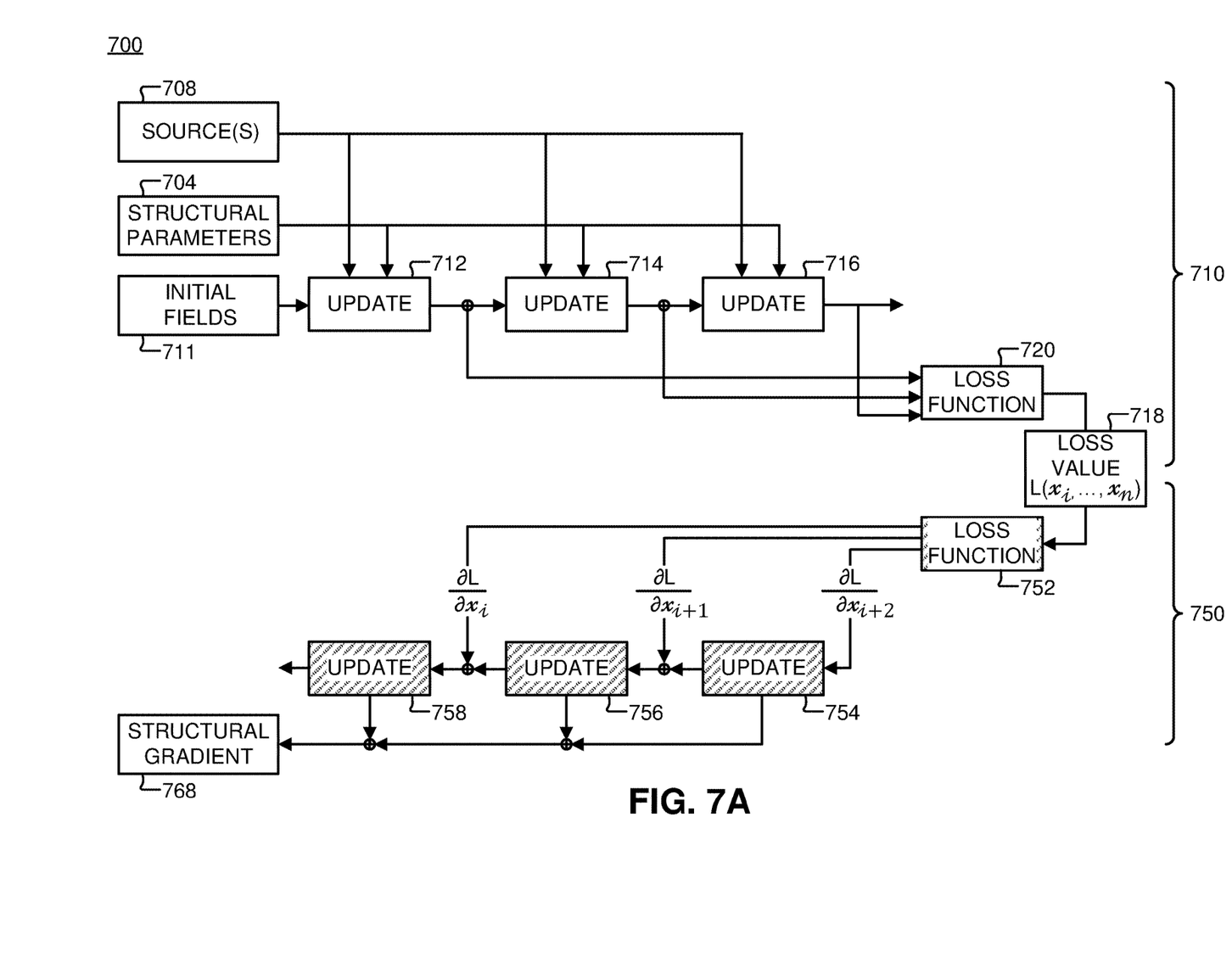
FIG. 7A is a flow chart illustrating example time steps for operational and adjoint simulations used to inverse design the optical modulator, in accordance with an embodiment of the disclosure.

FIG. 7A is a flow chart 700 illustrating example time steps for a time-forward simulation 710 and backpropagation 750 within a simulated environment, in accordance with an embodiment of the present disclosure. Flow chart 700 is one possible implementation that a design model may use to perform a forward operational simulation 710 and backpropagation 750 of a simulated environment. In the illustrated embodiment, the forward operational simulation utilizes a FDTD method to model the field response (both electric and magnetic) at a plurality of time steps in response to an excitation source. More specifically, the time-dependent Maxwell's equations (in partial differential form) are discretized to solve for field vector components (e.g. the field response of each of the plurality of voxels 610 of the simulated environment 601 in FIGS. 6A-6C) over a plurality of time steps.

As illustrated in FIG. 7A, the flow chart 700 includes update operations for a portion of operational simulation 710 and adjoint simulation 750. Operational simulation 710 occurs over a plurality of time-steps (e.g., from an initial time step to a final time step over a pre-determined or conditional number of time steps having a specified time step size) and models changes (e.g., from the initial field values 711) in electric and magnetic fields of a plurality of voxels describing the simulated environment and/or physical device that collectively correspond to the field response. More specifically, update operations (e.g., 712, 714, and 716) are iterative and based on the field response, structural parameters 704, and one or more physical stimuli sources 708. Each update operation is succeeded by another update operation, which are representative of successive steps forward in time within the plurality of time steps. For example, update operation 714 updates the field values 713 (see, e.g., FIG. 6B) based on the field response determined from the previous update operation 712, sources 708, and the structural parameters 704. Similarly, update operation 716 updates the field values 715 (see, e.g., FIG. 7B) based on the field response determined from update operation 714. In other words, at each time step of the operational simulation the field values (and thus field response) are updated based on the previous field response and structural parameters of the physical device. Once the final time step of the operational simulation 710 is performed, the loss value 718 may be determined (e.g., based on a pre-determined loss function 720 or loss function 205). The loss gradients determined from block 752 may be treated as adjoint or virtual sources (e.g., physical stimuli or excitation source originating at an output region) which are backpropagated in reverse (from the final time step incrementally through the plurality of time steps until reaching the initial time step) to determine structural gradient 768.

In the illustrated embodiment, the FDTD solve (e.g., time-forward simulation 710) and backpropagation 750 problem are described pictorially, from a high-level, using only "update" and "loss" operations as well as their corresponding gradient operations. The simulation is set up initially in which the structure parameters, the excitation source, and the initial field states of the simulated environment (and electromagnetic device) are provided. As discussed previously, the field states are updated in response to the excitation source based on the structural parameters. More specifically, the update operation is given by $\phi$, where $x_{i+1} = \phi(x_i, b_i, z)$ for $i = 1, \ldots n$. Here, $n$ corresponds to the total number of time steps (e.g., the plurality of time steps) for the time-forward simulation, $x_i$ corresponds to the field response (the field value associated with the electric and magnetic fields of each of the plurality of voxels) of the simulated environment at time step $i$, $b_i$ corresponds to the excitation source(s) (the source value associated with the electric and magnetic fields for each of the plurality of voxels) of the simulated environment at time step $i$, and $z$ corresponds to the structural parameters describing the topology and/or material properties of the electromagnetic device.

It is noted that using the FDTD method, the update operation can specifically be stated as:

$$\phi(x_i, b_i, z) = A(z) x_i + B(z) b_i \quad (1)$$

That is to say the FDTD update is linear with respect to the field and source terms. Concretely, $A(z) \in \mathbb{R}^{N \times N}$ and $B(z) \in \mathbb{R}^{N \times N}$ are linear operators which depend on the structure parameters, $z$, and act on the fields, $x_i$, and the sources, $b_i$, respectively. Here, it is assumed that $x_i, b_i \in \mathbb{R}^N$ where N is the number of FDTD field components in the time-forward simulation. Additionally, the loss operation is given by $L = (x_1, \ldots, x_n)$, which takes as input the computed fields and produces a single, real-valued scalar (e.g., the loss value) that can be reduced and/or minimized.

In terms of revising or otherwise optimizing the structural parameters of the electromagnetic device, the relevant quantity to produce is $$\frac{dL}{dz},$$

which is used to describe the change in the loss value with respect to a change in the structural parameters of the electromagnetic device and is denoted as the "structural gradient" illustrated in FIG. 7A.

Figure 7B:
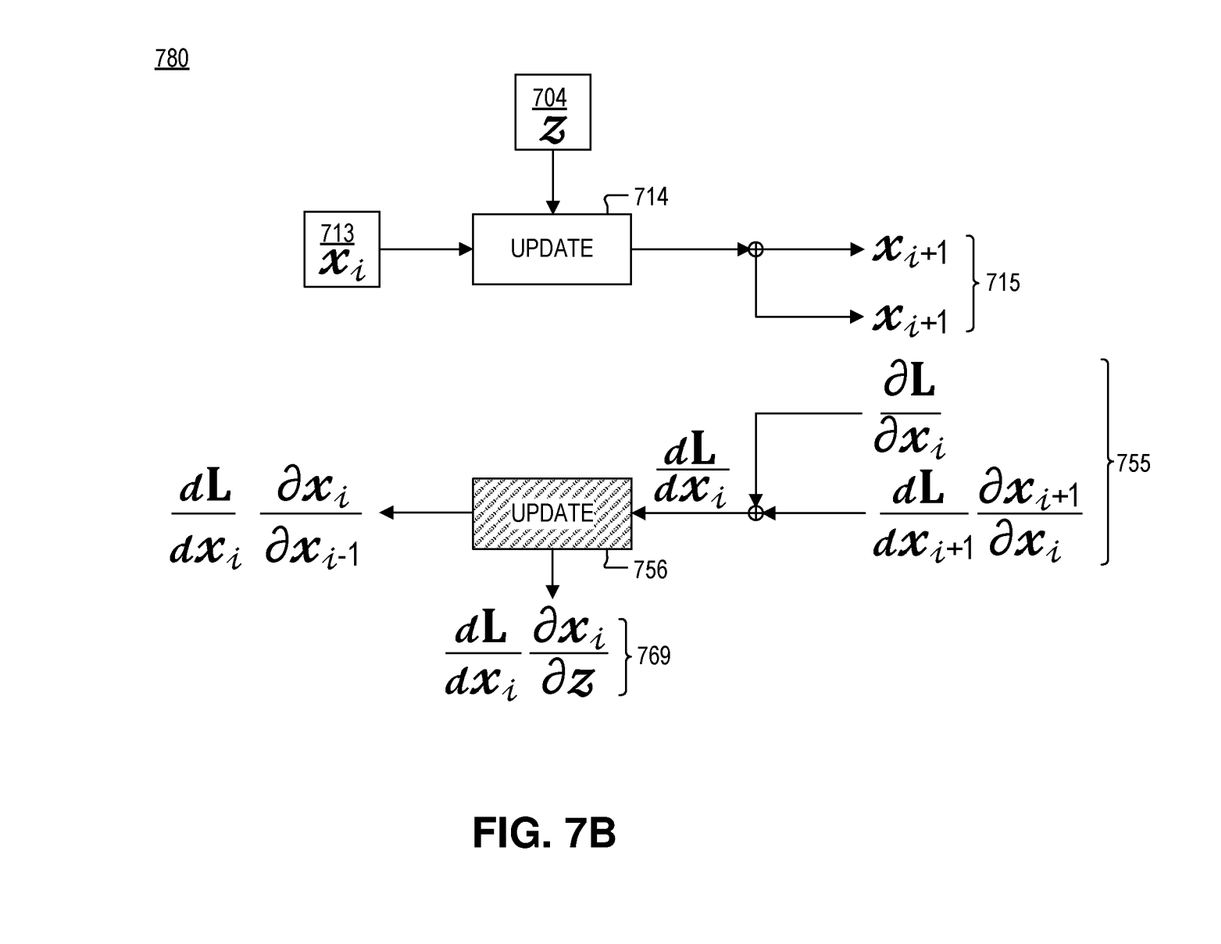
FIG. 7B is a flow chart illustrating a relationship between an operational simulation and the adjoint simulation (backpropagation), in accordance with an embodiment of the disclosure.

FIG. 7B is a chart 780 illustrating the relationship between the update operation for the operational simulation and the adjoint simulation (e.g., backpropagation), in accordance with an embodiment of the present disclosure. More specifically, FIG. 7B summarizes the operational and adjoint simulation relationships that are involved in computing the structural gradient, $$\frac{dL}{dz},$$

which include $$\frac{\partial L}{\partial x_i}, \frac{\partial x_{i+1}}{\partial x_i}, \frac{dL}{dx_i}, \text{ and } \frac{\partial x_i}{\partial z}.$$

The update operation 714 of the operational simulation updates the field values 713, $x_i$, of the plurality of voxels at the $i$th time step to the next time step (i.e., $i+1$ time step), which correspond to the field values 715, $x_{i+1}$. The gradients 755 are utilized to determine $$\frac{dL}{dx_i}$$

for the backpropagation (e.g., update operation 756 backwards in time), which combined with the gradients 769 are used, at least in part, to calculate the structural gradient, $$\frac{dL}{dz} \cdot \frac{\partial L}{\partial x_i}$$

is the contribution of each field to the loss value, L. It is noted that this is the partial derivative, and therefore does not take into account the causal relationship of $x_i \to x_{i+1}$. Thus, $$\frac{\partial x_{i+1}}{\partial x_i}$$

is utilized which encompasses the $x_i \to x_{i+1}$ relationship. The loss gradient, $$\frac{dL}{dx_i},$$

may also be used to compute the structural gradient, $$\frac{dL}{dz},$$

and corresponds to the total derivative of the field with respect to loss value, L. The loss gradient, $$\frac{dL}{dx_i},$$

at a particular time step, $i$, is equal to the summation of $$\frac{\partial L}{\partial x_i} + \frac{dL}{dx_{i+1}} \frac{\partial x_{i+1}}{\partial x_i}.$$

Finally, $$\frac{\partial x_i}{\partial z},$$

which corresponds to the field gradient, is used which is the contribution to $$\frac{dL}{dz}$$

from each time/update step.

$$\frac{dL}{dz}$$

is given by:

$$\frac{dL}{dz} = \Sigma_i \frac{dL}{dx_i} \frac{\partial x_i}{\partial z}. \tag{2}$$

For completeness, the full form of the first time in the sum, $$\frac{dL}{dz},$$

is expressed as:

$$\frac{dL}{dx_i} = \frac{\partial L}{\partial x_i} + \frac{dL}{dx_{i+1}} \frac{\partial x_{i+1}}{\partial x_i}. \tag{3}$$

Based on the definition of ϕ as described by equation (1), it is noted that $$\frac{\partial x_{i+1}}{\partial x_i} = A(z),$$

which can be substituted in equation (3) to arrive at an adjoint update for backpropagation (e.g., the update operations such as update operation 756), which can be expressed as:

$$\frac{dL}{dx_i} = \frac{\partial L}{\partial x_i} + \frac{dL}{dx_{i+1}} A(z), \tag{4}$$

or $$\nabla_{x_i} L = A(z)^T \nabla_{x_{i+1}} L + \frac{\partial L^T}{\partial x_i}. \tag{5}$$

The adjoint update is the backpropagation of the loss gradients from later to earlier time steps and may be referred to as a backwards solve for $$\frac{dL}{dx_i}.$$

The second term in the sum of the structural gradient, $$\frac{dL}{dz},$$

is denoted as:

$$\frac{\partial x_i}{\partial z} = \frac{d\phi(x_{i-1}, b_{i-1}, z)}{dz} = \frac{dA(z)}{dz} x_{i-1} + \frac{dB(z)}{dz} b_{i-1}, \tag{6}$$

for the particular form of ϕ described by equation (1).

Some processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical modulator, comprising:
   a modulation region including an inhomogeneous arrangement of two or more different materials having different refractive indexes;
   an input port optically coupled to the modulation region to inject an optical carrier wave into the modulation region;
   an output port optically coupled to the modulation region to receive and emit a modulated signal having a high state and a low state;
   a sink port optically coupled to the modulation region;
   a modulation actuator disposed proximate to the modulation region and adapted to apply a modulation bias to the modulation region that influences the different refractive indexes of the inhomogeneous arrangement to selectively steer a portion of an optical power of the optical carrier wave to the sink port when the modulated signal is modulated into the low state;
   a photoreceiver optically coupled to the sink port to harvest energy from the portion of the optical power steered to the sink port during the low state of the modulated signal; and
   a modulation controller coupled to the modulation actuator, wherein the modulation controller is at least partially powered from the portion of the optical power steered to the sink port during the low state of the modulated signal.

2. The optical modulator of claim 1, wherein the input, output, and sink ports comprise a core material and a cladding material, and wherein the inhomogeneous arrangement comprises a pattern of discrete regions of the core material and the cladding material of the input, output, and sink ports.

3. The optical modulator of claim 1, wherein the two or more different materials comprise a semiconductor material and an oxide material.

4. The optical modulator of claim 1, wherein the inhomogeneous arrangement comprises a pattern of discrete regions of the different materials, wherein the pattern is an inverse-design pattern defined by an iterative minimization of a loss function expressed as a sum of a transmission loss of the output port, a reflection loss of the input port, and a sink loss of the sink port.

5. The optical modulator of claim 1, wherein the modulation actuator comprises one of:
   an electrode adapted to apply the modulation bias across the modulation region as an adjustable voltage;
   a heating element adapted to apply the modulation bias across the modulation region as an adjustable temperature; or
   an electromechanical actuator adapted to apply the modulation bias across the modulation region as an adjustable pressure.

6. The optical modulator of claim 1, wherein the input port, the output port, and the sink port all comprise waveguide sections that physically abut the modulation region.

7. The optical modulator of claim 6, wherein the waveguide sections of the input port and the output port are aligned parallel to each other and the waveguide section of the sink port is aligned perpendicular to the waveguide sections of the input and output ports.

8. The optical modulator of claim 6, wherein the waveguide sections of the input, output, and sink ports are all aligned parallel to each other with the output and sink ports disposed on an opposite side of the modulation region as the input port.

9. The optical modulator of claim 6, wherein the waveguide sections of the sink port and the output port are both perpendicular to the waveguide section of the input port.

10. The optical modulator of claim 6, wherein the sink port comprises a first sink port, the optical modulator further comprising:
    a second sink port optically coupled to the modulation region, wherein the inhomogeneous arrangement of the two or more different materials is arranged to simultaneously steer portions of the optical power of the optical carrier wave to both of the first and second sink ports during the low state of the modulated signal.

11. An optical modulator, comprising:
    a modulation region including an inhomogeneous arrangement of two or more different materials having different refractive indexes;
    an input port optically coupled to the modulation region to inject an optical carrier wave into the modulation region;
    an output port optically coupled to the modulation region to receive and emit a modulated signal having a high state and a low state;
    a sink port optically coupled to the modulation region;
    a modulation actuator disposed proximate to the modulation region and adapted to apply a modulation bias to the modulation region that influences the different refractive indexes of the inhomogeneous arrangement to selectively steer a portion of an optical power of the optical carrier wave to the sink port when the modulated signal is modulated into the low state; and
    a modulation controller coupled to the modulation actuator, wherein the modulation controller is at least partially powered from the portion of the optical power steered to the sink port during the low state of the modulated signal, wherein the modulation actuator comprises one of:

an electrode adapted to apply the modulation bias across the inhomogeneous arrangement of two or more different materials as an adjustable voltage;

or an electromechanical actuator adapted to apply the modulation bias across the inhomogeneous arrangement of two or more different materials as an adjustable pressure.

* * * * *